Patented Jan. 1, 1946

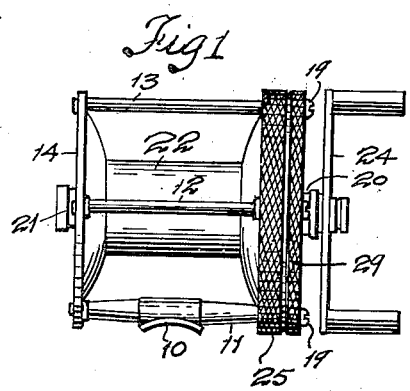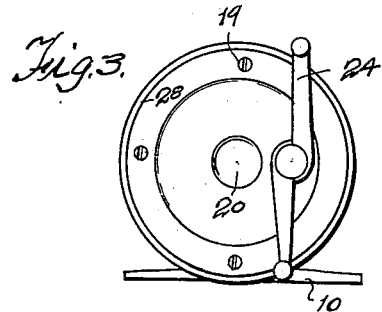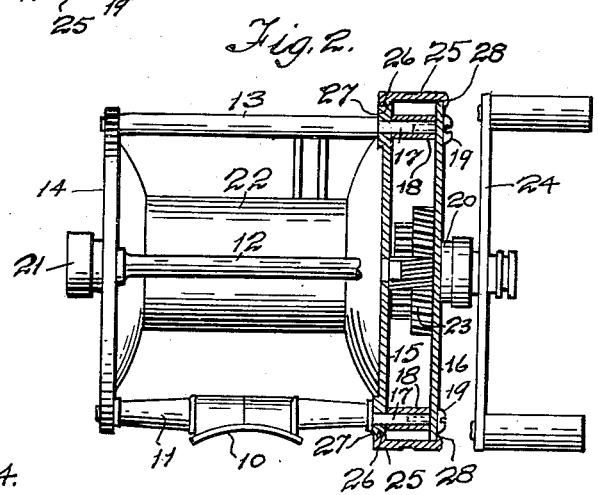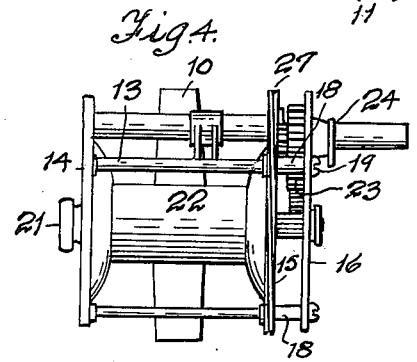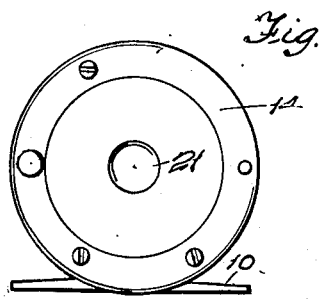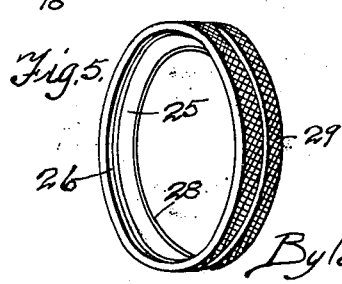

2,391,935

UNITED STATES PATENT OFFICE 2,391,935

FISHING REEL

Walter Willman, St. Petersburg, Fla., assignor to James Heddon's Sons, Dowagiac, Mich., a corporation of Michigan Application August 21, 1944, Serial No. 550,389

5 Claims. (Cl. 242—84.1)

In order to maintain a fishing reel in proper working condition, it becomes necessary from time to time to obtain access to the gearing enclosed within the head end of the reel for the purpose of cleaning and oiling the same, and in various types of reels, with which I am familiar, it is necessary to remove an outer cap which encloses the gearing and affords a bearing for the spool spindle so that with the removal of the cap, the operating group becomes disassembled thereby requiring care in the readjustment of the parts and the reassembling of the reel. In these circumstances it frequently happens that the necessary cleaning and oiling of the parts is neglected so that the action of the reel is impeded with the resultant wear and deterioration of the structure.

The present invention overcomes the above difficulties by providing an enclosing ring which may be readily removed by unscrewing and without the necessity for the employment of tools, thereby enabling convenient access to be obtained to the interior of the reel without in any way disturbing the operating assembly which remains intact so that the original factory adjustment of the parts will not be disturbed in any way.

The arrangement, however, is one which permits complete disassembling of the working parts for replacement or repair as occasion may require. However, the ease with which access may be obtained to the interior for cleaning and oiling, serves as an inducement to the fisherman to exercise reasonable care in maintaining his reel in a proper condition which is often neglected, especially in the case of a novice, where the use of tools is required and care must be exercised in reassembling the parts in their intended relation.

Further objects and details will appear from a description of the invention in conjunction with the accompanying drawing, wherein Figure 1 is a rear elevation of the reel of the present invention;

Fig. 2 an enlarged rear elevation with the head of the reel in section to reveal the interior construction;

Fig. 3 a right hand side elevation of the reel;

Fig. 4 a plan view showing the enclosing ring removed;

Fig. 5 a left hand side elevation of the reel; and

Fig. 6 a perspective view of the enclosing ring.

The principal operating portions of the reel may be of any conventional type either with or without level winding features so that it will be understood that the present invention is not directed to specific details in the arrangement of the gearing or such accessory features as a click, drag, or level winding arrangement, and that for purposes of illustration, a relatively simple type of reel is shown which, however, serves as a basis for the mounting of the removable ring which in conjunction with the inner and outer head plates constitutes that portion of the reel structure to which the present invention is particularly directed. The reel as a whole comprises the usual reel clip plate 10 which is carried by the lower pillar 11 which in conjunction with side pillars 12 and a top pillar 13 serves to connect the tail plate 14 with inner and outer spaced head plates 15 and 16 respectively. The pillars at their head ends are shouldered to provide reduced stems 17 which are surrounded by spacer sleeves 18 which serve to separate the inner and outer head plates, and the connection of the parts is completed by the provision of headed screws 19 entered through the outer head plate and threaded into the ends of the stems as shown in Fig. 2. With the screws 19 tightened, the reel frame will be held rigidly together to serve as a mounting for the working parts, and save on occasions when it may become necessary to renew one of the working parts, it will not be necessary to remove the screws or impair the rigidity of the frame as a whole.

The inner and outer head plates, in conjunction with the tail plate, afford bearings 20 and 21 for the spindle of the spool 22 which bearings are of any conventional type and need not be described in detail. The inner and outer head plates afford mountings for a train of gearing 23 of any conventional type which transmits rotation from the handle 24 to the spindle of the spool in the usual manner. It will be understood that the details of the bearings and gear train may be varied or modified along conventional lines and that the features of the present invention are concerned, rather with the means provided for permitting access to be had to the interior space occupied by the gear train and bearings, than to the details of construction and arrangement of the operating parts themselves.

The reel frame heretofore described, together with the working parts in their assembled relation constitute in themselves a complete self-contained operating unit, but obviously it is necessary to provide an enclosure between the inner and outer head plates in order to protect the working assembly against the ingress of dirt or moisture, and for this purpose a ring 25 is employed which is provided with inwardly projecting threads 26 along its inner margin adapted to engage with threads 27 on the peripheral edge of the inner head plate 15. The ring around its outer margin is provided with an inwardly extending lip 28 which when the ring is screwed into place will bear snugly against the outer marginal face of the outer head plate 16, thereby affording a cylindrical side wall for the head and closely sealing the interior thereof against the ingress of dirt or moisture. The diameter and width of the ring are such as to enable it to be slipped over the handle and brought into position to easily engage with the threads on the inner head plate, and in bringing the parts into threading relation, the outer head plate will serve to properly center the ring so that the threads will engage without danger of overlapping or maladjustment which might result in the stripping of the threads which are necessarily limited in the number of convolutions by reason of the thinness of the threaded edge of the inner head plate. The outer surface 29 of the ring is knurled to provide a frictional grip for the user's fingers, and in appearance the reel as a whole is practically indistinguishable from reels of conventional pattern which customarily employ an integrally flanged cap as a head plate with the result that with the removal of the cap, the bearings and mountings for the working assembly will be removed and the working parts will require restoration to their operative positions when the cap is replaced.

In the case of the present invention, the easy and convenient removal of the ring itself by a simple unscrewing operation will open up the space occupied by the gearing so that easy access from all sides can be had to the interior for purposes of cleaning and oiling the gears and associated surfaces without, however, disturbing the gear assembly in the slightest degree so that it will maintain the intended factory adjustment at all times. At the same time if it becomes necessary, the outer plate can be easily taken off after removing the enclosing ring, and in this event the gear group can be disassembled for repair or removal as occasion may require.

By extending the pillars across the interior of the head space and thus providing a rigid support for the outer head plate, independently of the ring itself, the latter can be employed solely as a removable closing member to bridge the gap between the two plates rather than as a rigid structural connection and this enables the operating assembly to remain intact despite the removal of the ring which is not the case in conventional practice in which the head cap, with its integral circumferential flange, constitutes a structural unit which cannot be removed without thereby breaking the unity of the operating assembly.

I claim:

1. In a fishing reel the combination of a tail plate and spaced inner and outer head plates and a spool journalled between the tail plate and the head plates, connections between the tail plate and the two head plates adapted to provide a rigid self-contained framework for the operating assembly with extended exposure of the space between the head plates, a handle externally of the outer head plate, a gear train between the handle and the spool, located within the space between the inner and outer head plates and held in assembled operating relation thereby, and an enclosing ring removably secured to one of the head plates and adapted when in place to circumferentially enclose the space between the inner and outer head plates independently of the operating assembly.

2. In a fishing reel the combination of a tail plate and spaced inner and outer head plates and a spool journalled between the tail plate and the head plates, connections between the tail plate and the two head plates adapted to provide a rigid self-contained framework for the operating assembly with extended exposure of the space between the head plates, such connections being in the form of pillars extending between the tail plate and the inner head plate and shouldered to provide reduced extensions between the inner and outer head plates, a handle externally of the outer head plate, a gear train between the handle and the spool, located within the space between the inner and outer head plates and held in assembled operating relation thereby, and an enclosing ring removably secured to one of the head plates and adapted when in place to circumferentially enclose the space between the inner and outer head plates independently of the operating assembly.

3. In a fishing reel the combination of a tail plate and spaced inner and outer head plates and a spool journalled between the tail plate and the head plates, connections between the tail plate and the two head plates adapted to provide a rigid self-contained framework for the operating assembly with extended exposure of the space between the head plates, such connections being in the form of pillars extending between the tail plate and the inner head plate and shouldered to provide reduced extensions surrounded by spacer sleeves between the inner and outer head plates, a handle externally of the outer head plate, a gear train between the handle and the spool, located within the space between the inner and outer head plates and held in assembled operating relation thereby, and an enclosing ring removably secured to one of the head plates and adapted when in place to circumferentially enclose the space between the inner and outer head plates independently of the operating assembly.

4. In a fishing reel the combination of a tail plate and spaced inner and outer head plates and a spool journalled between the tail plate and the head plates, connections between the tail plate and the two head plates adapted to provide a rigid self-contained framework for the operating assembly with extended exposure of the space between the head plates, a handle externally of the outer head plate, a gear train between the handle and the spool, located within the space between the inner and outer head plates and held in assembled operating relation thereby, and an enclosing ring threaded onto the margin of the inner head plate and provided with a lip overlapping the margin of the outer head plate and adapted when in place to circumferentially enclose the space between the inner and outer head plates independently of the operating assembly.

5. In a fishing reel the combination of a tail plate and spaced inner and outer head plates and a spool journalled between the tail plate and the head plates, connections between the tail plate and the two head plates adapted to provide a rigid self-contained framework for the operating assembly with extended exposure of the space between the head plates, such connections being in the form of pillars extending between the tail plate and the inner head plate and shouldered to provide reduced extensions surrounded by spacer sleeves between the inner and outer head plates, a handle externally of the outer head plate, a gear train between the handle and the spool, located within the space between the inner and outer head plates and held in assembled operating relation thereby, and an enclosing ring threaded onto the margin of the inner head plate and provided with a lip overlapping the margin of the outer head plate and adapted when in place to circumferentially enclose the space between the inner and outer head plates independently of the operating assembly.

WALTER WILLMAN.